(12) United States Patent
Wang et al.

(10) Patent No.: US 11,382,056 B2
(45) Date of Patent: Jul. 5, 2022

(54) LOCATION-BASED RESOURCE SCHEDULING

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/040,794

(22) PCT Filed: Apr. 12, 2019

(86) PCT No.: PCT/US2019/027395
§ 371 (c)(1),
(2) Date: Sep. 23, 2020

(87) PCT Pub. No.: WO2019/200363
PCT Pub. Date: Oct. 17, 2019

(65) Prior Publication Data
US 2021/0058881 A1    Feb. 25, 2021

Related U.S. Application Data

(63) Continuation of application No. 15/953,235, filed on Apr. 13, 2018, now abandoned.

(51) Int. Cl.
*H04W 84/06*    (2009.01)
*H04W 56/00*    (2009.01)
*H04W 64/00*    (2009.01)

(52) U.S. Cl.
CPC ....... *H04W 56/006* (2013.01); *H04W 64/006* (2013.01)

(58) Field of Classification Search
CPC . H04W 56/006; H04W 64/006; H04W 84/06; H04W 72/046; H04W 56/0045
See application file for complete search history.

(56) References Cited

U.S. PATENT DOCUMENTS 6,388,997 B1    5/2002  Scott
8,086,249 B1   12/2011  Dinan et al.
(Continued)

FOREIGN PATENT DOCUMENTS

CN    106199666    12/2016
EP      2020786     2/2009
(Continued)

OTHER PUBLICATIONS

"International Search Report and Written Opinion", PCT Application No. PCT/US2019/27395, dated Jun. 17, 2019, 14 pages.
(Continued)

*Primary Examiner* — Julio R Perez
(74) *Attorney, Agent, or Firm* — Colby Nipper PLLC

(57) ABSTRACT

The present disclosure describes techniques and systems for location-based resource scheduling, to reduce or eliminate receiving transmissions, by the base station, over one or more communication resources allocated for another communication. In some aspects, a user device (102) establishes a wireless connection (106) with a base station (104). The user device (102) receives, from the base station (104), a propagation delay message (304). The propagation delay message (304) schedules a delay for a transmission of the user device (102). The delay is based on a location of the user device (1020) being outside of a standard distance (614) from the base station (104). The user device (102) then transmits, to the base station (104), the transmission according to the propagation delay message (304).

20 Claims, 10 Drawing Sheets

(56) References Cited

U.S. PATENT DOCUMENTS

| | | | |
|---|---|---|---|
| 8,958,412 | B2 | 2/2015 | Singh et al. |
| 10,218,422 | B2 | 2/2019 | Raghavan et al. |
| 2011/0158117 | A1 | 6/2011 | Ho et al. |
| 2013/0051286 | A1* | 2/2013 | Schultz ............. H04W 56/0015 370/278 |
| 2013/0301619 | A1 | 11/2013 | Singh et al. |
| 2015/0195795 | A1 | 7/2015 | Loehr et al. |
| 2016/0323832 | A1 | 11/2016 | Love et al. |
| 2017/0127367 | A1 | 5/2017 | Axnäs et al. |
| 2017/0374637 | A1* | 12/2017 | Akkarakaran ...... H04W 64/006 |
| 2018/0279325 | A1 | 9/2018 | Huang et al. |
| 2019/0081657 | A1 | 3/2019 | Zeng et al. |
| 2019/0361111 | A1* | 11/2019 | Sadiq ........................ G01S 1/08 |
| 2020/0028768 | A1* | 1/2020 | Sadiq ................ H04W 56/0055 |
| 2020/0154442 | A1 | 5/2020 | Zhou |
| 2021/0099221 | A1* | 4/2021 | Park .................... H04B 17/318 |
| 2021/0185632 | A1* | 6/2021 | Manolakos ........... H04W 72/06 |
| 2021/0302561 | A1* | 9/2021 | Bayesteh ............. G01S 13/876 |
| 2021/0306895 | A1* | 9/2021 | Chen .................... H04W 24/08 |

FOREIGN PATENT DOCUMENTS

| | | |
|---|---|---|
| GB | 2512688 | 10/2014 |
| WO | 2017082642 | 5/2017 |
| WO | 2018130115 | 7/2018 |
| WO | WO2019200363 | 10/2019 |

OTHER PUBLICATIONS

"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Swamy, "LTE: Timing Advance and Time Alignment Timer", How LTE Stuff Works?, retrieved from http://howltestuffworks.blogspot.com/2014/07/timing-advance-and-time-alignment-timer.html on Jul. 21, 2020., 2014, 8 pages.
Wu, "Handling Overheating in a Wireless-Communication Device", Technical Disclosure Commons; Retrieved from https://www.tdcommons.org/dpubs_series/2343, Jul. 12, 2019, 22 pages.
"International Preliminary Report on Patentability", Application No. PCT/US2019/027395, dated Oct. 22, 2020, 9 pages.
"Foreign Office Action", EP Application No. 19721457.0, dated Nov. 29, 2021, 8 pages.
"Foreign Office Action", IN Application No. 202047042205, dated Dec. 3, 2021, 6 pages.

* cited by examiner

LOCATION-BASED RESOURCE SCHEDULING

BACKGROUND

Generally, wireless communication is managed by a provider of a wireless network. For example, a base station provides a cell of a wireless network and manages wireless communication with user devices associated with the wireless network. The provider of the wireless network determines a schedule of communication resources of the wireless network for uplink and downlink transmissions with the user devices. In conventional wireless networks, the base station can schedule a standard time interval between a downlink transmission by the base station and a responsive uplink transmission by a user device. Additionally, in conventional wireless networks, the base station can schedule the user devices to transmit data during a same communication resource as the base station is scheduled to receive the data.

With recent advances in wireless communication technology, a base station can associate with one or more user devices in a cell by segmenting the cell provided by the base station into beams to communicate over longer distances. However, these advances can provide new challenges for managing a schedule for wireless communication.

SUMMARY

This document describes techniques for, and systems that enable, location-based resource scheduling. With advances in wireless communication technology allowing for wireless connections over increased distances, conventional scheduling of downlink and responsive uplink communications may result in lost communications and an increased error rate. For example, if a user device is beyond a standard distance from a base station, a propagation time for communicating can be significant enough to disrupt standard communication protocols. This disruption can be particularly evident for communication protocols that utilize reflected beam paths for communicating with user devices because a distance of the communication path is increased relative to a direct communication path. Additionally or alternatively, this disruption can be particularly evident for wireless networks that operate over long distances, such as those operating over satellite-based relays or base stations. Location-based resource scheduling can account for a user device being located beyond a standard distance from a base station, thereby reducing or avoiding lost communications or decreasing an error rate for uplink transmissions.

In some aspects, a user device establishes, via a transceiver of the user device, a wireless connection with a base station. The base station provides a cell of a wireless network. The base station can associate with one or more user devices in the cell by segmenting the cell provided by the base station into beams to communicate over longer distances. The user device receives, from the base station, a propagation delay message. The propagation delay message schedules a delay for a transmission of the user device. The delay is based on a location of the user device being outside of a standard distance from the base station. The user device then begins the transmission, to the base station, after the delay scheduled by the propagation delay message.

In other aspects, a user device includes a processor, a hardware-based transceiver, and a computer-readable storage medium having instructions stored thereon. Responsive to execution of the instructions by the processor, the processor performs operations relating to location-based resource scheduling. The operations include establishing, via the hardware-based transceiver, a wireless connection with a base station of a wireless network. The operations also include identifying a propagation delay for communicating with the base station over the wireless connection. The propagation delay indicates a delay for transmitting, relative to a standard timing for transmitting, based on a location of the user device. The operations further include receiving, from the base station via the hardware-based transceiver, a prompt for transmitting data to the base station. The operations then include beginning transmission of the data, to the base station and via the hardware-based transceiver, after the delay indicated by the propagation delay message.

In further aspects, a base station includes a processor, one or more hardware-based transceivers, and a computer-readable storage medium having instructions stored thereon. Responsive to execution of the instructions by the processor, the processor performs operations relating to location-based resource scheduling. The operations include providing, via the one or more hardware-based transceivers, a cell of a wireless network and segmenting the cell into multiple beams for communicating with user devices. The operations also include determining a propagation delay for a wireless connection, over a beam of the multiple beams, with one of the user devices. The propagation delay is based on a distance, along a path of the beam, between the user device and the base station. The operations further include transmitting, via the one or more hardware-based transceivers, a propagation delay message to the user device. The propagation delay message indicates a transmission delay, based on the propagation delay, for a transmission by the user device. The operations then include receiving, via the one or more hardware-based transceivers, the transmission from the user device based on the propagation delay message.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of location-based resource scheduling for wireless networks is described below. The use of the same reference numbers in different instances in the description and the figures indicate similar elements.

DETAILED DESCRIPTION

Figure 1:
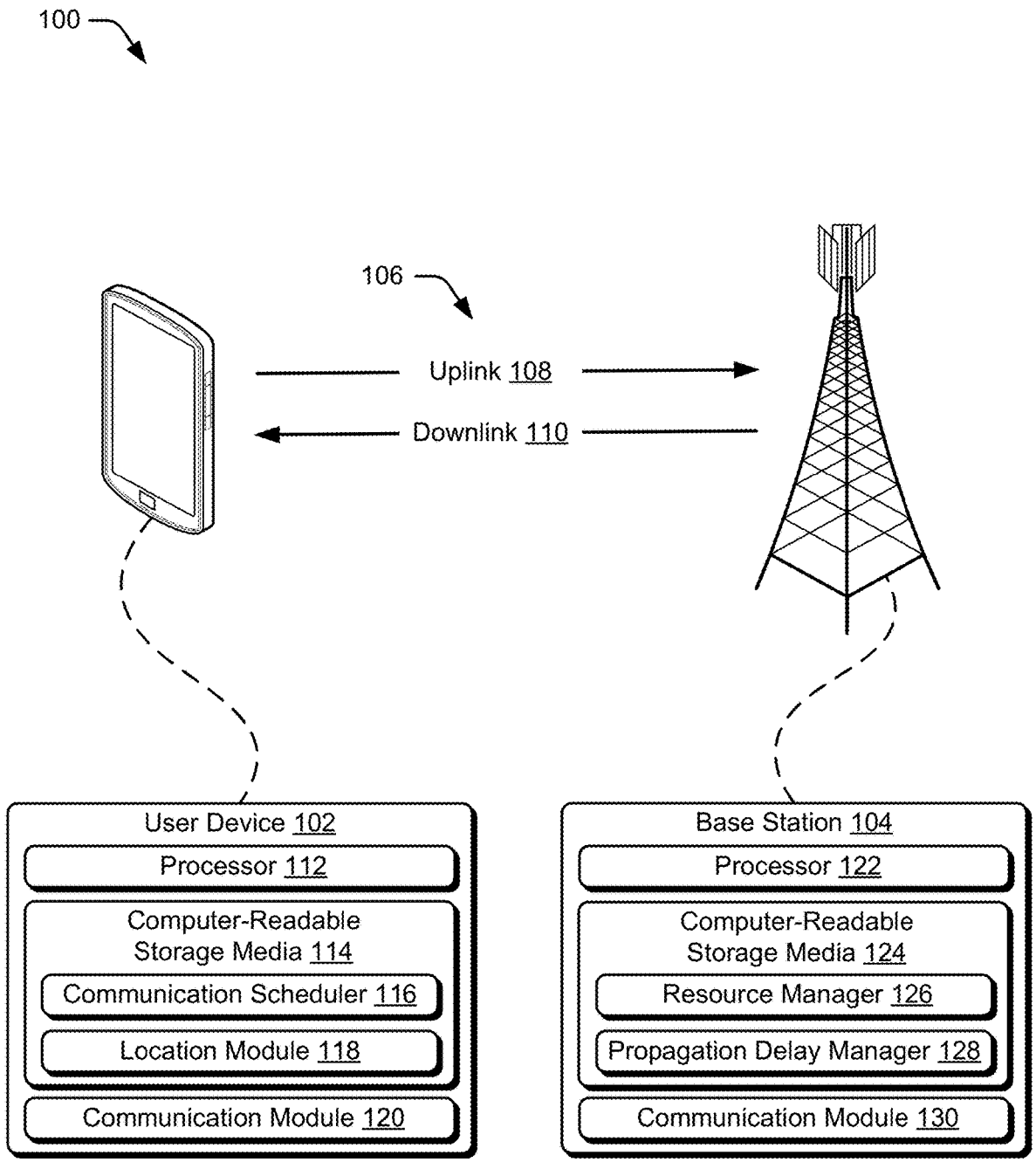
FIG. 1 illustrates example device configurations of a user device and a base station in accordance with one or more aspects of location-based resource scheduling.

Base stations of wireless networks manage wireless connections with user devices by scheduling communication resources for communicating with the user devices. In some instances, a new transmission is responsive to a previous reception of data from the base station. Within a standard distance of a base station, propagation times for the previous reception and the new transmission are small enough to be managed by the base station without significantly reducing transmission quality or interfering with a transmission over a subsequent communication resource. However, some advanced wireless communication technologies use signal reflections to transmit data between the base station and the user device. This can result in a transmission distance being greater than a direct, physical distance between the user device and the base station. Additionally or alternatively, some advanced wireless communication technologies use orbital devices, such as satellites, as base stations or relays for providing a cell of a wireless network. The resulting transmission distances of some advanced wireless communication technologies can be large enough to negatively affect an ability of the base station to properly identify and decode a transmission from the user device.

This document describes techniques and systems for location-based resource scheduling. Location-based resource scheduling includes scheduling transmissions by a user device and receptions by the base station to account for a time-of-flight of the transmissions. In some implementations, the base station transmits a propagation delay message with instructions for transmissions by the user device. These instructions may include a transmission delay, relative to a standard timing for transmissions, to cause the user device to transmit with a delay such that the transmissions are received by the base station during a scheduled communication resource that is delayed from a standard reception window. This can reduce or eliminate receiving the transmissions, by the base station, during one or more communication resources allocated for another transmission or reception.

In an illustrative implementation, a base station receives location data from a user device. Based on the location data, the base station determines that a transmission distance for communicating with the user device exceeds a standard distance. If the user device is scheduled to transmit data according to a standard transmission timing, a propagation delay will cause the data to be received by the base station later than scheduled. This can result in the data interfering with data scheduled for transmission over a subsequent communication resource and can cause the base station to be unable to decode the data. Based on the determination, the base station determines to delay a transmission by the user device. The base station determines a delay, relative to the standard transmission timing, to shift beginning the transmission such that it will be received by the base station over a communication resource that is later than a standard-timed communication resource. In this way, the transmission can be received during a delayed reception window that includes the later communication resource. This can reduce or avoid interference with data scheduled for transmission over subsequent communication resources.

The following discussion describes an operating environment and techniques that may be employed in the operating environment and/or network environment. In the context of the present disclosure, reference is made to the operating environment or networking environment by way of example only.

Operating Environment

FIG. 1 illustrates an example operating environment 100 in which devices for location-based resource scheduling can be implemented. In this example, the operating environment includes a user device 102 and a base station 104, which are respectively configured to communicate over a wireless connection 106 of a wireless network. Generally, the wireless connection 106 includes an uplink 108 by which the user device 102 transmits data to the base station 104 and a downlink 110 by which the base station 104 transmits other data to the user device 102, such as grants for further communications. Although shown or described with reference to a separate uplink 108 or downlink 110, communication between the user device 102 and base station 104 may also be referenced as a wireless association, a frame exchange, a wireless link, or a communication link.

The wireless connection 106 may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, a long-term evolution (LTE) protocol, an LTE Advanced protocol, a 5th Generation (5G) New Radio (NR) protocol, or a future advanced protocol. The protocol may operate based on frequency division duplexing (FDD) or time division duplexing (TDD). The wireless connection 106 may operate over a high bandwidth, such as a bandwidth greater than 1 GHz. Further, the wireless connection 106 may be configured to allow for operation at high frequencies, such as frequencies above 3 GHz, as well as lower frequencies, such as those between 0.5 GHz and 3 GHz.

The user device 102 includes a processor 112, computer-readable storage media (CRM) 114 having a communication scheduler 116 and a location module 118, and a communication module 120. The user device 102 is illustrated as a smart phone, however the user device 102 may instead be implemented as any device with wireless communication capabilities, such as a mobile gaming console, a tablet, a laptop, an advanced driver assistance system (ADAS), a point-of-sale (POS) terminal, a health monitoring device, an unmanned aircraft, a camera, a media-streaming dongle, a wearable smart-device, an internet-of-things (IoT) device, a personal media device, a navigation device, a mobile-internet device (MID), a wireless hotspot, a femtocell, a smart vehicle, or a broadband router.

The processor 112 of the user device 102 can execute processor-executable instructions or code stored by the CRM 114 to cause the user device 102 to perform operations or implement various device functionalities. In this example, the CRM 114 also stores processor-executable code or instructions for implementing one or more of the communication scheduler 116 or the location module 118 of the user device 102. The communication scheduler 116 or the location module 118 may be implemented as modules including one or more of hardware or software.

A processor, such as the processor 112, can be implemented as an application processor (e.g., multicore processor) or a system-on-chip with other components of the user device 102 integrated therein. A CRM, such as the CRM 114, may include any suitable type of memory media or storage media, such as read-only memory (ROM), programmable ROM (PROM), random access memory (RAM), static RAM (SRAM), or Flash memory. In the context of this discussion, a CRM is implemented as hardware-based storage media, which does not include transitory signals or carrier waves. In some cases, a CRM stores one or more of firmware, an operating system, or applications of an associated device as instructions, code, or information. The instructions or code can be executed by an associated processor to implement various functionalities of the associated device, such as those related to network communication.

In some aspects, the communication scheduler 116 identifies data for transmitting to, or requesting from, the base station 104. The communication scheduler 116 may identify the data autonomously, in response to a reception via the downlink 110, or in response to user input. The communication scheduler may request, from the base station 104, a grant for communication resources to communicate over the uplink 108 or the downlink 110. For example, the communication scheduler 116 causes the user device 102 to transmit, via a physical uplink control channel (PUCCH), a request for an uplink grant identifying allocated resources to transmit application data to the base station 104. When the user device 102 receives the uplink grant for transmitting the data, the communication scheduler 116 schedules the data for transmission according to the uplink grant.

The location module 118 may access data using a hardware component of the user device 102, such as a global navigation satellite system receiver or a Wi-Fi transceiver. The location module 118 uses the data to determine a location of the user device 102. In some implementations, the location module 118 uses beam information from the wireless connection 106 to determine a location of the user device 102 based on a beam of the wireless connection 106 over which the user device 102 and the base station 104 communicate. A location of the user device 102 may include data relating to, for example, one or more of a position on the Earth, a physical distance from the base station, a transmission distance from the base station along a beam path, a direction from the base station, an elevation relative to sea level, a beam over which the user device 102 and the base station 104 communicate, a location relative to another user device, or an estimated time-of-flight for communication with the base station 104. The location module 118 may also compare the location data with a map index that is either stored locally or accessed remotely.

The communication module 120 of the user device 102 includes a hardware-based transceiver and associated circuitry or other components for communicating with the base station 104 via a wireless medium. For example, the communication module 120 may transmit, via a transmitter of the transceiver, data to the base station 104 via one or more channels of the uplink 108. This data transmitted to the base station 104 may include any suitable type of framed or packetized information, such as a device location, a sounding reference signal (SRS), a physical random access channel (PRACH) communication, device status information, wireless connection status information, wireless connection control information, data requests, application data, or network access requests. The communication module 120 may also receive, via a receiver of the transceiver, other data from the base station 104, such as application data, downlink pilots, primary or secondary synchronization signals (PSSs or SSSs), a master information block (MIB), a system information block (SIB), a downlink grant, an uplink grant, wireless connection configuration settings, network control information, or a communication mode selection.

In this example, the base station 104 is shown generally as a cellular base station of a wireless network. The base station 104 may be implemented to provide and manage a cell of a wireless network that includes multiple other base stations that each manage another respective cell of the wireless network. As such, the base station 104 may communicate with a network management entity or others of the multiple base stations to coordinate connectivity or handoffs of mobile stations within or across the cells of the wireless network.

The base station 104 can be configured as any suitable type of base station or network management node, such as a GSM base station, a node base (Node B) transceiver station (e.g., for UNITS), an evolved NodeB (eNB, e.g., for LTE), or a next generation Node B (gNB, e.g., for 5G NR). As such, the base station 104 may control or configure parameters of the uplink 108 or the downlink 110 in accordance with one or more of the wireless standards or protocols described herein.

The base station 104 includes a processor 122, a computer-readable storage media (CRM) 124 having a resource manager 126 and a propagation delay manager 128, and a communication module 130. In this example, the CRM 124 also stores processor-executable code or instructions for implementing the resource manager 126 and the propagation delay manager 128 of the base station 104.

In some aspects, the resource manager 126 of the base station 104 is implemented to perform various functions associated with allocating physical access (e.g., resource blocks) or communication resources available to the base station 104. The physical access, such as an air interface of the base station 104, may be partitioned or divided into various units (e.g., frames) of one or more of bandwidth, time, symbols, or spatial layers. For example, within a framework of a 5G NR protocol, the resource manager 126 can allocate bandwidth and time intervals of access in resource blocks, each of which may be allocated in whole, or in part, to one or more channels for communicating with the user device 102. The resource blocks may include multiple subcarriers, each of which spans a portion of a frequency domain of the resource blocks. The subcarriers may be further divided into resource elements, or orthogonal frequency-division multiplexing (OFDM) symbols, each of which spans a portion of a time domain of the subcarriers. Consequently, a resource block includes multiple OFDM symbols that can be grouped into subcarriers with other OFDM symbols having a common frequency.

In some aspects, the propagation delay manager 128 determines a propagation delay for communicating with user devices located outside of a standard distance or standard range. The propagation delay may be based on an observed or predicted time-of-flight for communications transmitted between the user devices and the base station. Based on a time-of-flight, the propagation delay manager 128 can determine to schedule reception of transmissions from the user devices over a delayed communication resource that is later than a standard-timed communication resource. The propagation delay manager 128 may also generate a propagation delay message to transmit to the user device 102 to schedule a delay for a transmission by the user device 102 such that the transmission will be received by the base station 104 over the delayed communication resource. Additionally or alternatively, the base station 104 may transmit an uplink grant to the user device 102 that schedules transmissions over a first set of resources, and schedule reception of the transmissions over a second set of resources that are later than the first set of resources, based on a propagation delay.

The communication module 130 includes a hardware-based transceiver that includes a receiver, a transmitter, and associated circuitry or other components for communicating with the user device 102 via the wireless medium. The communication module 130 may be configured to communicate over a frequency range of the wireless medium and over multiple spatial layers and beams. For instance, the communication module 130 may be configured to communicate a first data stream over a first spatial layer and a second data stream over a second spatial layer. The communication module 130 may be configured for beam-formed communication with multiple user devices. In some cases, the communication module 130 includes, or is coupled with, multiple hardware-based transceivers and antenna arrays that are configured to establish and manage wireless connections with multiple user devices via one or more beams. The base station 104 may transmit any suitable data or information to the user device 102 through the downlink 110, such as the propagation delay message, a schedule of allocated communication resources, downlink pilots, application data, wireless connection-status information, or wireless connection-control information.

Figure 2:
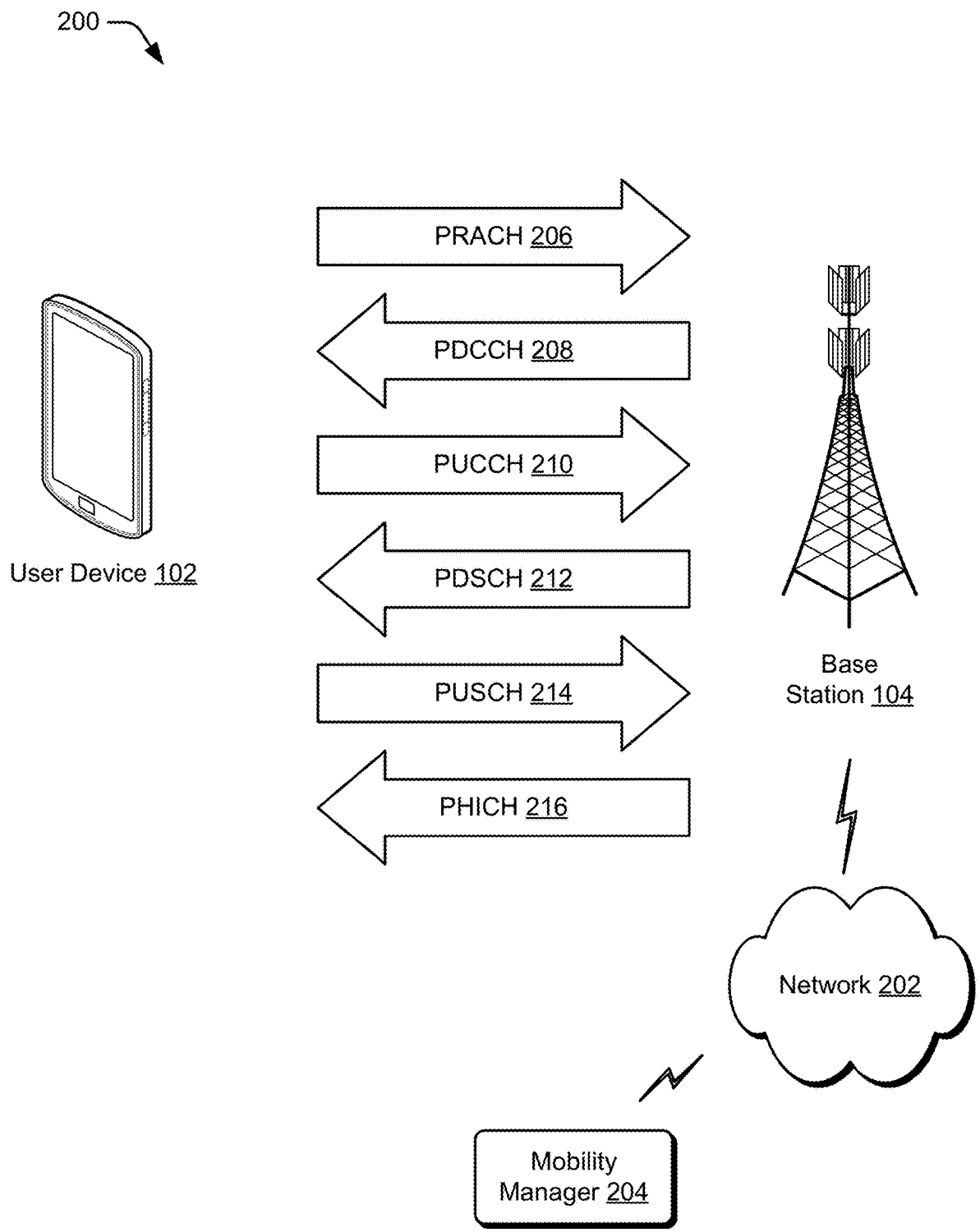
FIG. 2 illustrates example channels of communication over which the user device and base station may communicate in accordance with one or more aspects of location-based resource scheduling.

FIG. 2 illustrates an example networking environment 200 in which a user device and a base station may communicate in accordance with one or more aspects of location-based resource scheduling can be implemented. The network environment includes respective instances of the user device 102 and the base station 104, which provides a wireless network with which the user device 102 and other user devices may associate. Through the wireless network, the base station 104 may enable or provide access to other networks or resources, such as a network 202 (e.g., the Internet) connected via a backhaul link (e.g., fiber network). Additionally or alternately, the networking environment 200 may include other base stations or a mobility manager 204, such as a mobility management entity (MME) or an access and mobility management function (AMF), to provide an area wide wireless network, such as a 5G NR network and associated data services.

The user device 102 and/or the base station 104 may communicate through any suitable type or combination of channels, message exchanges, or network management procedures. In this example, the wireless connection 106 includes one or more channels such as a PRACH 206, a physical downlink control channel (PDCCH) 208, a PUCCH 210, a physical downlink share channel (PDSCH) 212, a physical uplink shared channel (PUSCH) 214, or a physical hybrid automatic repeat request (HARQ) indicator channel (PHICH) 216.

The user device 102 can transmit a request for an uplink or downlink grant via the PRACH 206. The user device 102 may also use the PRACH 206 to request that the base station 104 establish the wireless connection 106 with the user device 102. Generally, the PRACH 206 is a low-bandwidth channel for carrying small amounts of data.

The PDCCH 208 can be used by the base station 104 to communicate downlink control information (DCI) messages and/or a radio resource control (RRC) messages to the user device 102. In some aspects, the DCI messages include identification of resource elements to be used for communication of data to the user device 102. The DCI messages may also include a modulation scheme and coding/decoding information for the user device 102 to access the data communicated to the user device 102.

The PUCCH 210 may be useful to transmit, to the base station 104, one or more of HARQ acknowledge/not acknowledge (ACK/NACK), channel quality indicators (CQI), multiple-input-multiple-output (MIMO) feedback such as a rank indicator (RI) or a precoding matrix indicator (PMI), scheduling requests for uplink transmission, or binary phase-shift keying (BPSK) or quadrature phase-shift keying (QPSK) for PUCCH modulation. In the context of location-based resource scheduling, the user device 102 may transmit location data over resources of the PUCCH 210.

The PDSCH 212 may be used by the base station 104 to transmit application data to the user device 102. The PDSCH 212 may be dynamically sized based on a request for data by the user device 102 or a determination by the base station 104 to transmit application data to the user device 102.

The user device 102 may send additional data or other information to the base station 104 via the PUSCH 214. The PUSCH 214 may include radio resource control (RRC) communications, uplink control information (UCI) messages, and application data. The user device 102 can transmit regularly-scheduled application data to the base station 104 over the PUSCH.

The base station 104 may send additional data to the user device 102 via the PHICH 216. The PHICH 216 includes acknowledgements or lack of acknowledgements for data received from the user device 102 via the PUSCH 214.

In the context of location-based resource scheduling, the user device 102 may transmit a request for an uplink grant, to transmit data, via one of the PRACH 206 or the PUCCH 210. The request may include location data of the user device 102. The base station 104 determines a propagation delay, if any, based on the location data. The propagation delay may also be unique to a channel of the wireless connection 106. The base station 104 then transmits an uplink grant, for transmitting the data, to the user device 102 via the PDCCH 208. The base station 104 may also transmit a propagation delay message within, for example, a DCI message, a MIB, or a SIB. The propagation delay message instructs the user device 102 to delay transmission of the data for a partial, or whole, communication resource such that the data will be received by the base station 104 during a delayed reception window including one or more communication resources. The propagation delay message may include separate instructions for one or more of the channels of the wireless connection 106. In this way, the propagation delay message may schedule a delay for a transmission over a channel of the wireless connection 106 and another delay for another transmission over another channel of the wireless connection 106. The user device 102 then transmits the data over one of the PUCCH 210 or the PUSCH 214 to the base station 104, according to the propagation delay message and instructions provided therein.

In other implementations of location-based resource scheduling, the user device 102 determines its location and compares the location with a map index. Based on the comparison, the user device 102 determines a propagation delay for transmitting to the base station 104. The user device 102 then determines a transmission delay, based on the propagation delay, such that the transmission will be received by the base station 104 during a scheduled reception window. The user device 102 then transmits data to the base station 104 over one of the PRACH 206, the PUCCH 210, or the PUSCH 214 according to the propagation delay. The base station 104, also having access to the map index, or a copy of the map index, schedules a reception window for receiving the data based on the map index. For example, the map index may indicate a propagation delay for transmissions from user devices within a geographical region. The base station 104 communicates with user devices within the geographical region over one or more beams of the wireless network. Based on the user device transmitting over the one or more beams, the base station schedules a reception window based on a propagation delay associated with the geographical region, as identified in the map index.

Figure 3:
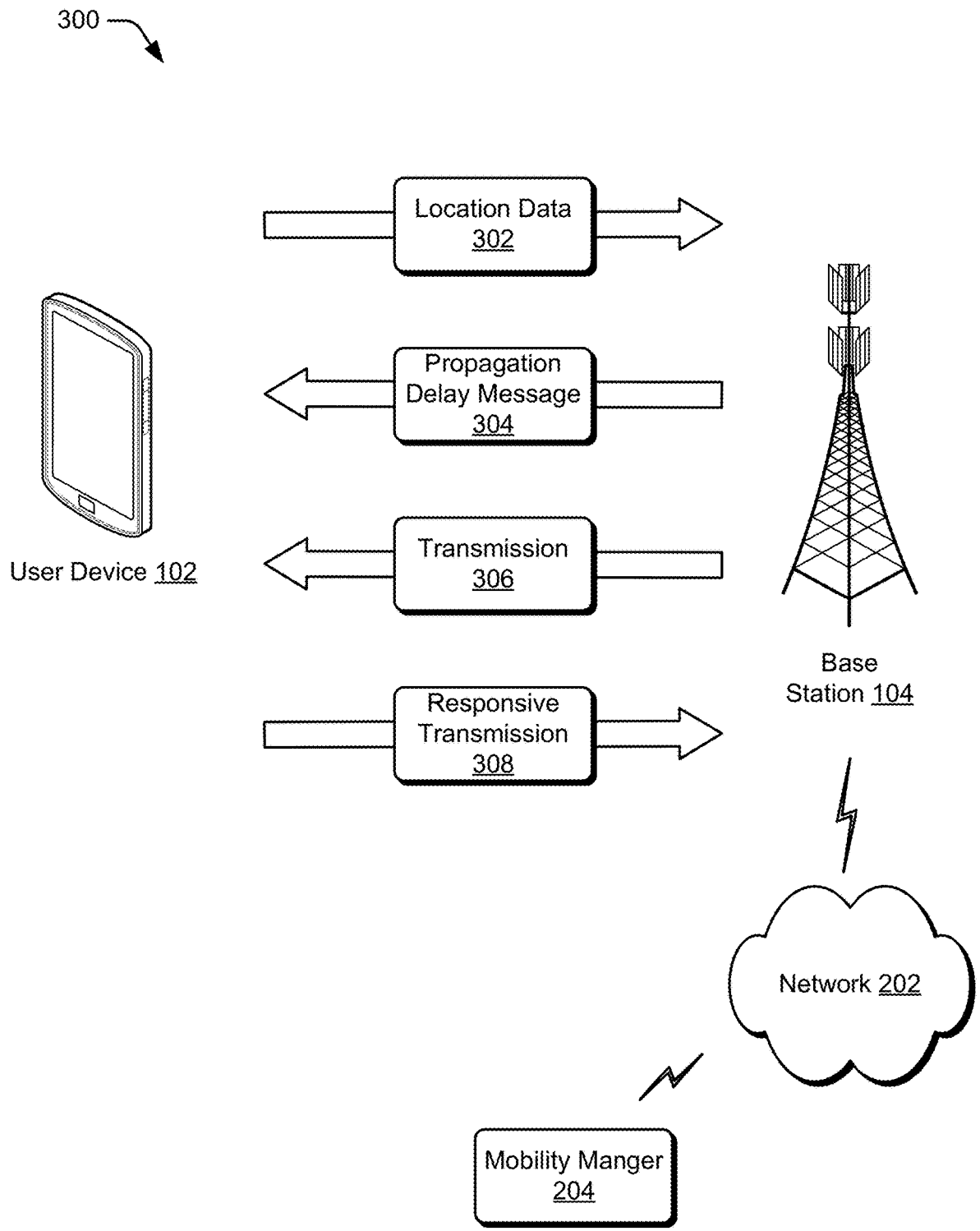
FIG. 3 illustrates an example networking environment in which the user device and base station may communicate in accordance with one or more aspects of location-based resource scheduling.

FIG. 3 illustrates an example networking environment 300 in which a user device and a base station may communicate in accordance with one or more aspects of location-based resource scheduling. The networking environment 300 includes respective instances of the user device 102, the base station 104, the network 202, and the mobility manager 204.

In this example, the user device 102 transmits, to the base station 104, location data 302. The base station 104 receives the location data over a channel of the wireless connection 106, such as the PUCCH 210 or the PUSCH 214. The base station 104 determines, based on the location data 302, a propagation delay for communicating with the user device 102. The propagation delay accounts for a time-of-flight of transmissions between the user device 102 and the base station 104. The propagation delay may include a portion or a whole time duration of a communication resource, such as one or more OFDM symbols or resource blocks. The base station 104 then determines an availability of resources for communicating with the user device 102, accounting for the propagation delay. A propagation delay message 304, identifying one or both of the propagation delay or a delay for transmitting to accommodate the propagation delay, is then transmitted to the user device 102 over a channel of the wireless connection 106, such as the PDCCH 208. Further, the base station 104 may transmit the propagation delay message 304 to one or more user devices via a MIB, a SIB, or a DCI message. In some implementations, the propagation delay message 304 also instructs the user device 102 to schedule a delay, relative to a scheduled downlink, for receiving a transmission from the base station 104. Additionally or alternatively, the propagation delay message may include a propagation delay of another beam over which communication with the base station 104 is available to the user device 102. In some of these implementations, the user device 102 can request transferring the communication with the base station 104 to the other beam.

The base station 104 transmits a transmission 306 to the user device 102. The transmission 306 requests a responsive transmission 308 from the user device. For example, the transmission 306 may include a resource grant for an uplink, a HARQ message, or application data. The user device 102 delays transmitting the responsive transmission by a partial, an entire, or multiple communication resources, based on the propagation delay message 304.

Figure 4:
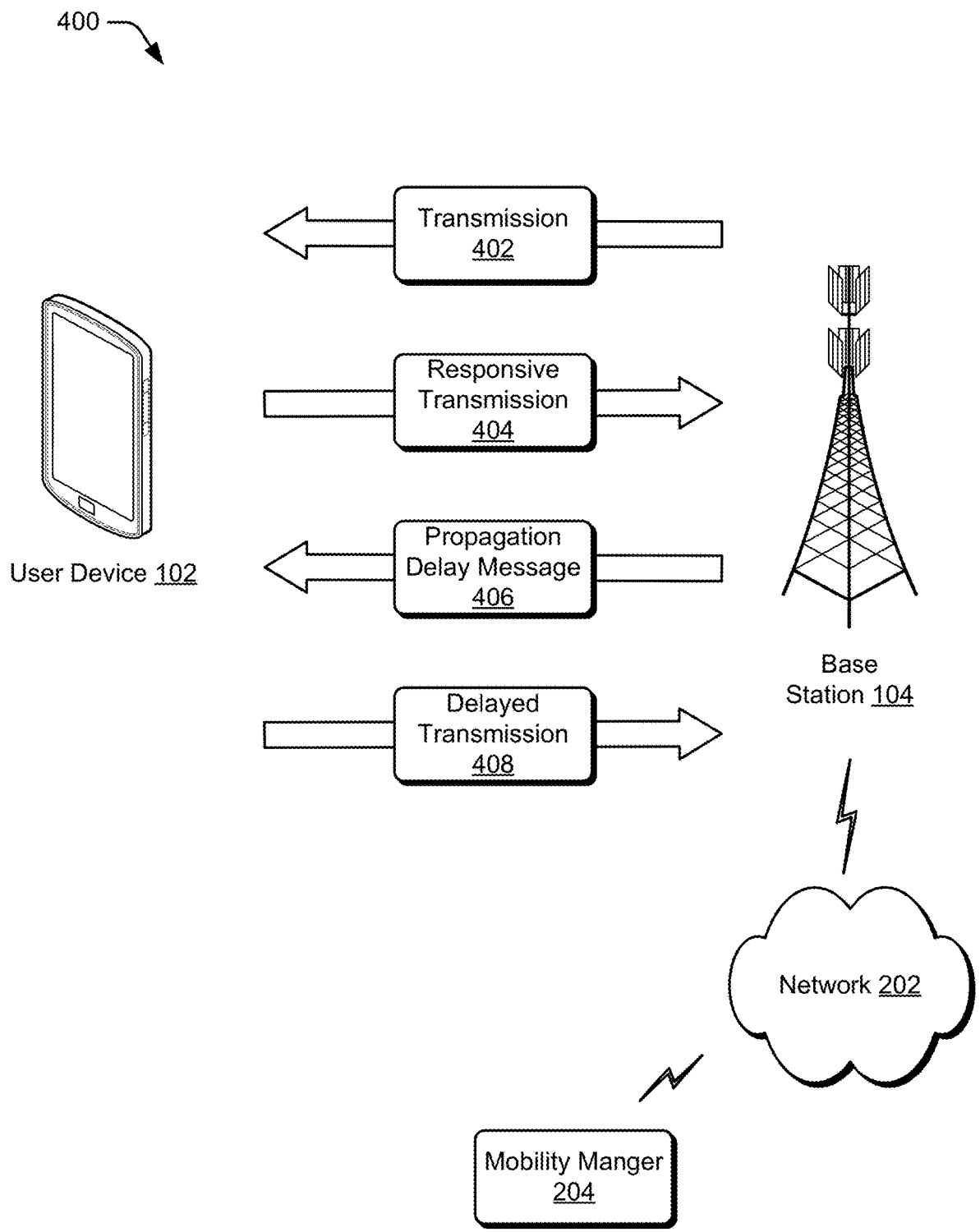
FIG. 4 illustrates another example networking environment in which the user device and base station may communicate in accordance with one or more aspects of location-based resource scheduling.

FIG. 4 illustrates another example networking environment 400 in which a user device and a base station may communicate in accordance with one or more aspects of location-based resource scheduling. The networking environment 400 includes respective instances of the user device 102, the base station 104, the network 202, and the mobility manager 204.

In this example, the base station 104 transmits, to the user device 102, a transmission 402. The user device 102, following a standard time interval between a downlink transmission and a responsive uplink transmission, transmits a responsive transmission 404 to the base station 104. For example, the transmission includes a HARQ message from the base station 104 and the responsive transmission 404 includes an ACK/NACK response to the HARQ message. The base station 104 determines a propagation delay based on a delay between actual reception of the responsive transmission 404 and a scheduled reception based on the standard time interval for transmitting a responsive uplink transmission.

The base station 104 transmits, to the user device 102, a propagation delay message 406 identifying one or both of the propagation delay or a delay for transmitting to accommodate the propagation delay. In some implementations, the propagation delay message 406 instructs the user device 102 to receive transmissions from the base station 104 as delayed downlink transmissions, according to the propagation delay. The user device 102 then transmits a delayed transmission 408, based on the propagation delay message 406.

Figure 5:
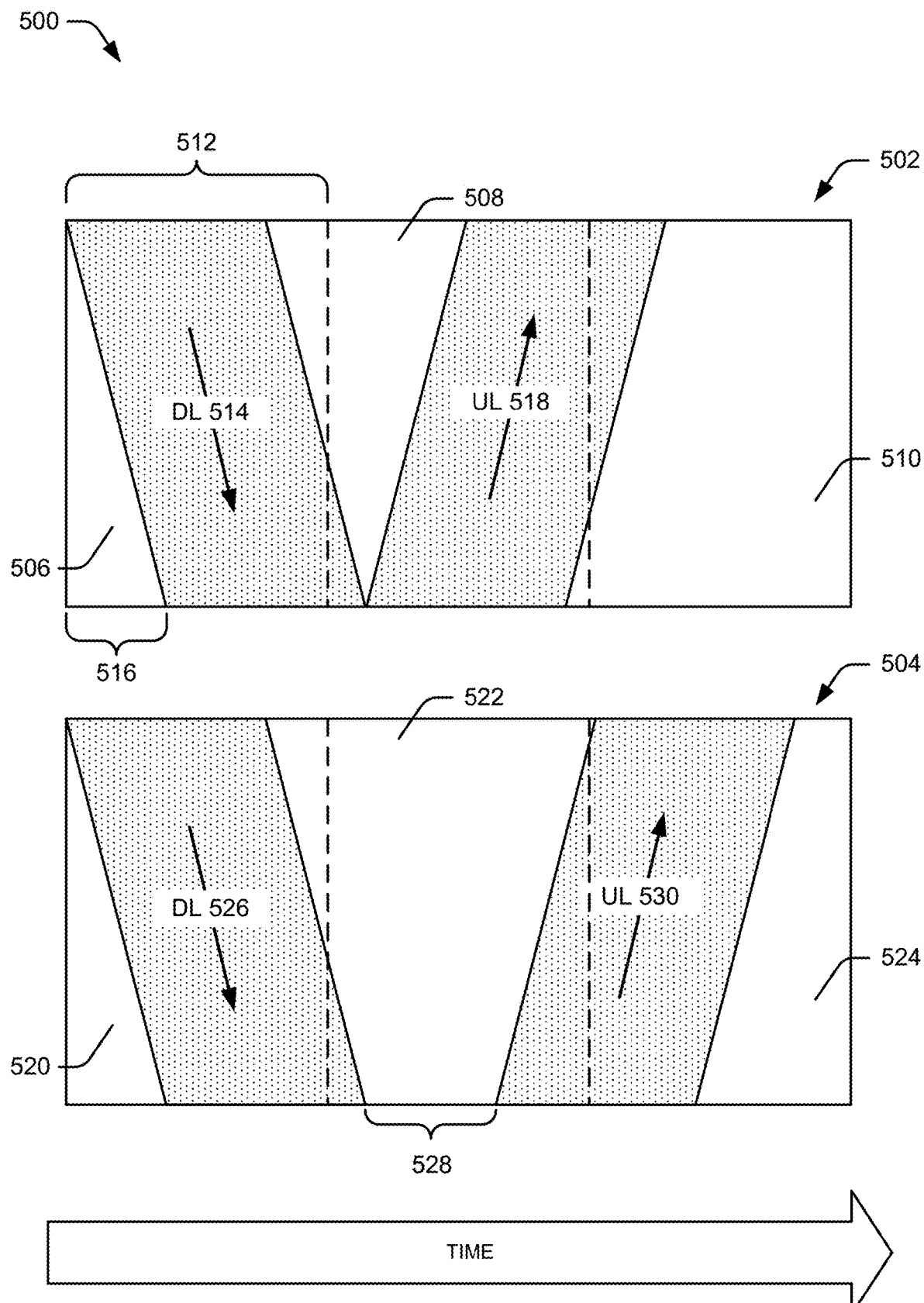
FIG. 5 illustrates transmissions over example sets of communication resources available for communication between the user device and the base station.

FIG. 5 illustrates example sets 500 of communication resources available for communication between the user device 102 and the base station 104 over the wireless connection 106. The sets 500 of resources include a first set 502 and a second set 504 of communication resources. The communication resources described herein may be, for example, one or more resource blocks, OFDM symbols, or resource elements. Although illustrated as sequential communication resources, the illustrated communication resources may be separated by one or more other communication resources.

The set 502 includes a series of communication resources 506, 508, and 510, each spanning a time interval 512, which may be consistent or varied. A base station transmits a downlink (DL) transmission 514 to a user device during the communication resource 506. However, based on a propagation delay 516, the user device does not completely receive the downlink transmission 514 during the communication resource 506. Instead, the user device receives the downlink transmission 514 during portions of the communication resource 506 and the communication resource 508.

The user device responds to the downlink transmission 514 after a standard time interval, which is shown in this example as immediately after completely receiving the downlink transmission 514. However, a protocol may designate another standard time interval such as four OFDM symbols or three transmission time intervals. The user device transmits an uplink transmission 518 after the standard time interval. The uplink transmission 518 is shown as being transmitted entirely during the communication resource 508, but in other implementations, the uplink transmission 518 may be transmitted over multiple communication resources, such as the communication resources 508 and 510, based on the propagation delay 516.

The base station receives the uplink transmission 518 over the communication resources 508 and 510 based on another propagation delay 516 due to a time-of-flight of the uplink transmission 518. If unaccounted for, this can cause a scheduling conflict if the base station is scheduled to receive or transmit another transmission during the communication resource 510. Under standard conditions, where a propagation delay is small, a standard reception window may be all or a portion of the communication resource 508. When a propagation delay is significant enough to cause a reception of at least a portion of the uplink transmission 518 to occur outside of the standard reception window, the base station can increase a size of, or shift a timing for, a reception window for receiving the uplink transmission 518 based on the propagation delay 516. For example, the reception window, based on the propagation delay 516, can be increased to include a portion or all of the communication resource 508 and a portion or all of the communication resource 510.

The set 504 includes a series of communication resources 520, 522, and 524, each spanning the time interval 512. The base station transmits a downlink (DL) transmission 526 to a user device during the communication resource 520 with the propagation delay 516. The user device does not completely receive the downlink transmission 526 during the communication resource 520. Instead, the user device receives the downlink transmission 526 during portions of the communication resource 520 and the communication resource 522.

The user device determines a delay (transmission delay) 528 for responding to the downlink transmission 526 to reduce or avoid a scheduling conflict for the base station. The user device may determine the delay 528 by, for example, receiving a propagation delay message from the base station or comparing a location of the user device with a map index that indicates a proper duration of the delay 528. The delay 528 may span a duration of time that is less than a duration of an entire communication resource, such as a resource block. This delay for a partial communication resource causes a beginning of the uplink transmission 530 to be offset from a beginning of both of the communication resources 522 and 524. In other implementations, the delay 528 spans one or more entire communication resources in addition to a partial communication resource. The user device transmits an uplink transmission 530 after the delay 528 such that the uplink transmission 530 is received by the base station over the communication resource 524. The base station, knowing the transmission delay, can schedule a delayed reception window, which includes the communication resource 524, for receiving the uplink transmission 530. The delayed reception window in this example begins at least one communication resource after a beginning of the standard reception window.

Based on the delay 528, the base station may schedule a reception window for fewer communication resources, or a smaller portion of a communication resource, than an implementation without the delay 528. This can provide an efficient scheduling scheme where the base station can schedule another transmission or reception during the communication resource 522. For example, the base station may schedule interweaving transmissions and receptions for two or more user devices, or unrelated communications with a single user device. The base station can schedule the communication resource 520 for a transmission with the user device, the communication resource 522 for a transmission or reception with another user device, and then the communication resource 524 for a reception with the user device.

Figure 6:
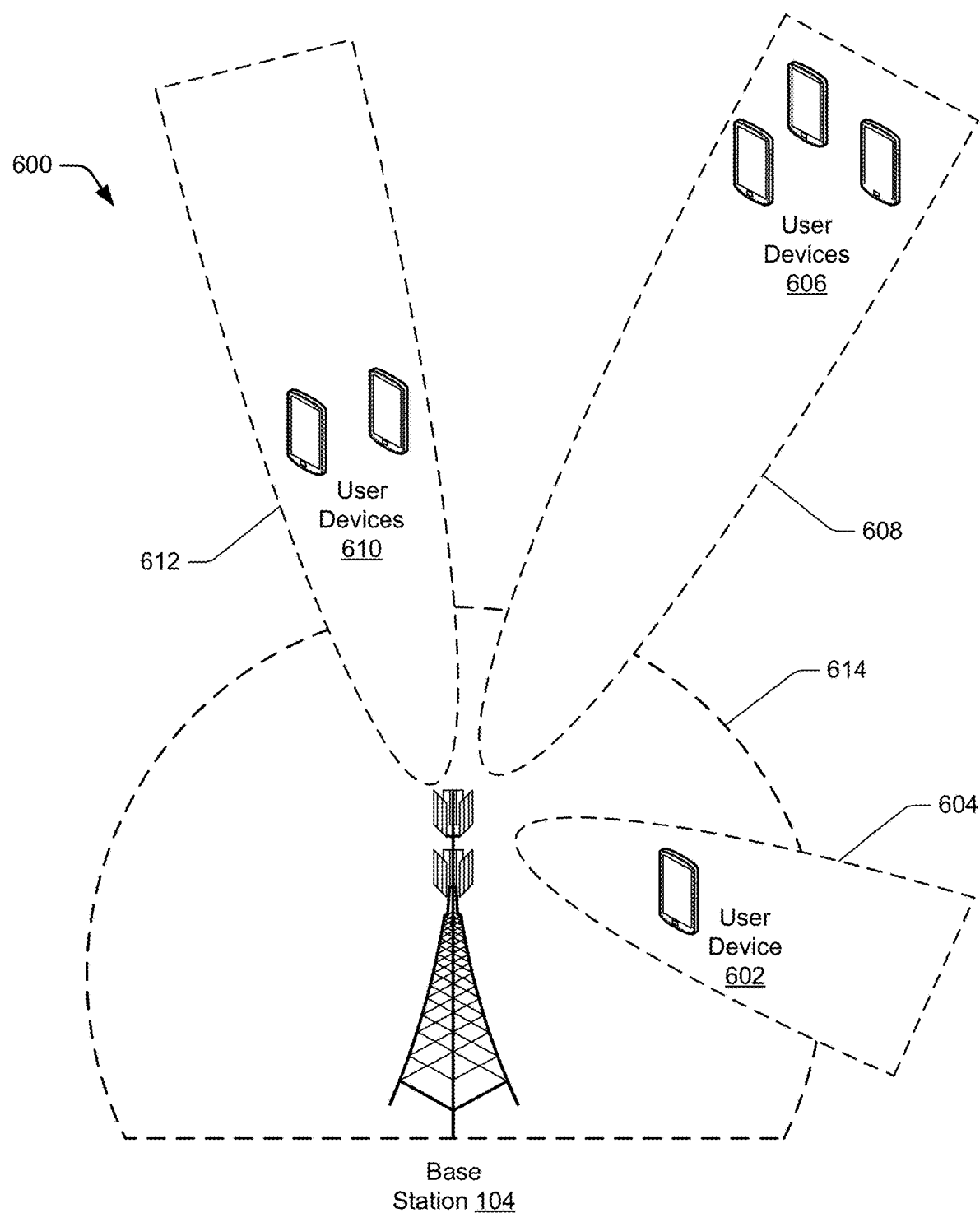
FIG. 6 illustrates an example networking environment including beams within a cell of the wireless network provided by the base station in accordance with one or more aspects of location-based resource scheduling.

FIG. 6 illustrates an example networking environment 600 including beams within a cell of the wireless network provided by the base station 104 in accordance with one or more aspects of location-based resource scheduling. The base station 104 establishes a wireless connection with a user device 602 via a beam 604. The base station 104 also establishes wireless connections with user devices 606 via a beam 608 and user devices 610 via a beam 612. The beams 604, 608, and 612 may have direct or indirect beam paths to associated user devices. For example, the beam 608 may have an indirect path to the user devices 606 as the beam reflects off one or more objects between the base station 104 and the user devices 606.

The user device 602 is within a standard distance 614 of the base station. Therefore, the user device 602 can transmit responsive transmissions without a delay and the base station 104 can receive the responsive transmission within a standard reception window. The user devices 606 and 610 are outside of the standard distance 614 and a propagation delay is significant. Therefore, without accounting for the propagation delay, the base station 104 cannot receive responsive communications from the user devices 606 and 610 within a standard reception window. To account for the propagation delay, the base station 104 may transmit a propagation delay message to the user devices 606 and 610 including a delay for transmitting to the base station. Additionally or alternatively, the base station 104 may increase a size, or shift a timing, a reception window for receiving responsive communications from the user devices 606 and 610.

The propagation delay may have a duration that is different for each of the user devices 606 and 610; however, the differences between some of the user devices 606 and 610 may be insignificant. For this reason, various configurations of propagation delay messages may be appropriate. For example, the propagation delay message may be unique to each user device of the user devices 606 and 610, or the propagation delay message may be shared by one or more user devices of the user devices 606 and 610. Further, a same propagation delay message may be transmitted to all user devices on a common beam. For example, the base station 104 may transmit a first propagation delay message to the user devices 606 and a second propagation delay message to the user devices 610. In other examples, the base station 104 may transmit a same propagation delay message to multiple user devices based on a location of one of the user devices being near a location of another of the user devices.

Figure 7:
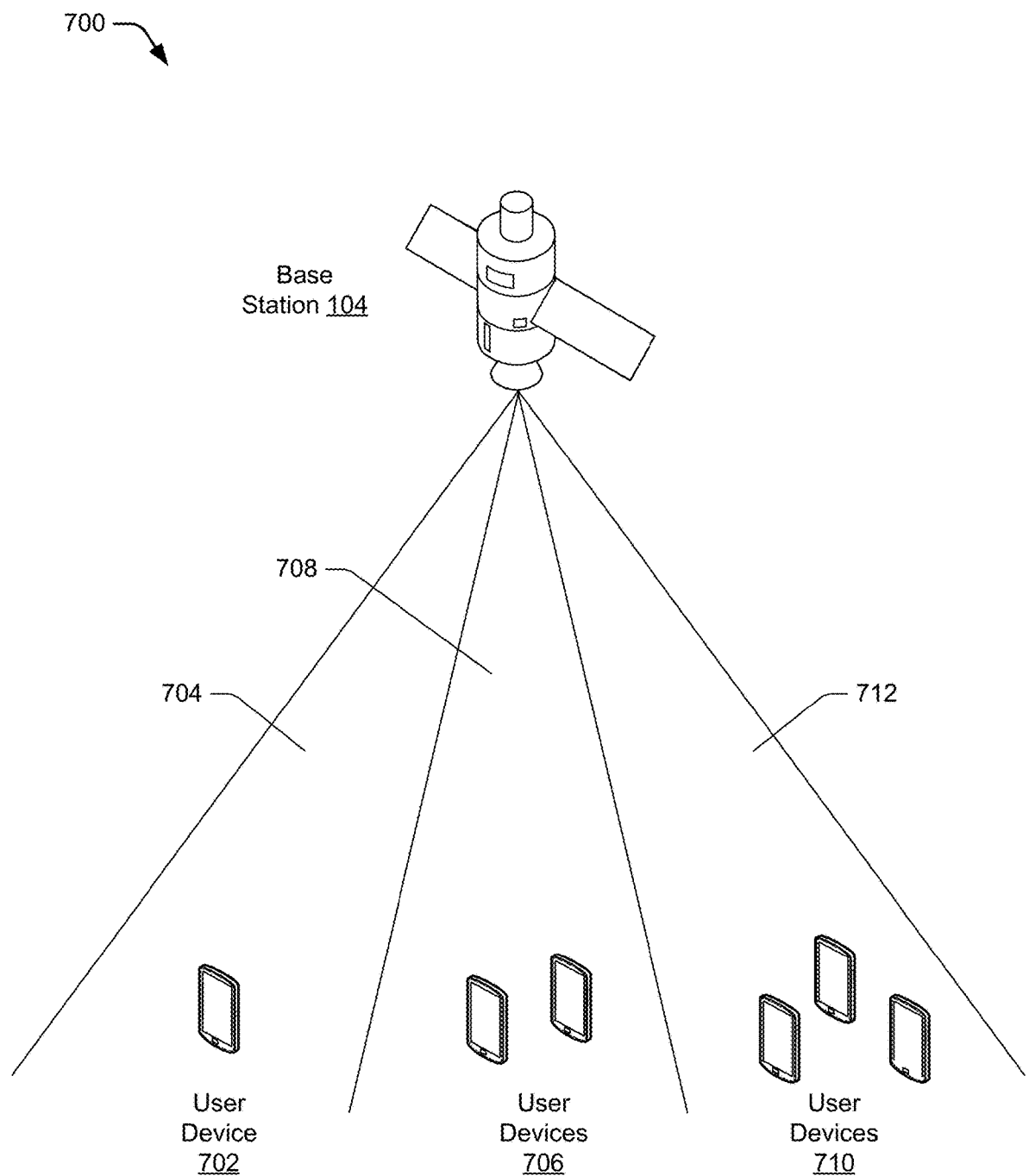
FIG. 7 illustrates another example networking environment including beams within a cell of the wireless network provided by the base station in accordance with one or more aspects of location-based resource scheduling.

FIG. 7 illustrates another example networking environment 700 including beams within a cell of the wireless network provided by the base station 104 in accordance with one or more aspects of location-based resource scheduling. The base station 104 is shown as an orbiting satellite, which may include a satellite orbiting in a Low Earth Orbit zone, a Medium Earth Orbit zone, a Geostationary or Geosynchronous Earth Orbit, or a High Earth Orbit zone. Alternatively, the base station 104 may be an aerial base station that is not in orbit. Additionally, the base station 104 may function as a relay or signal repeater for a terrestrial base station, or may include a terrestrial component that is remote from an orbital satellite component.

The base station 104 establishes a wireless connection with a user device 702 via a beam 704. The base station 104 also establishes wireless connections with user devices 706 via a beam 708 and user devices 710 via a beam 712. The beams 704, 708, and 712 may be directed to distinct regions of the Earth. The region of the Earth to which the beams are directed may have different distance ranges from the base station 104 based on lateral (longitudinal and latitudinal) displacement from the base station 104 and elevation of the Earth's surface at the regions. Based on the various distance ranges from the base station 104, a different transmission delay may be appropriate for user devices within the various beams.

The base station 104 may transmit one or more propagation delay messages to the user devices 702, 706, and 710 using, for example, a SIB, a MIB, or a DCI message. In some implementations, the user devices 702, 706, and 710 determine their respective locations and compare their respective locations with a map index. The map index can be known by the base station 104 based on a previous agreement between the base station 104 and the user devices 702, 706, and 710. The map index indicates an appropriate transmission delay for the user devices 702, 706, and 710 based on their respective locations. In other implementations a user device, such as the user device 702, uses a map index to determine a rough transmission delay. Once calibrated to the rough transmission delay, the user device can receive a propagation delay message from the base station 104 to tune the transmission delay. For example, the rough transmission delay may allow a transmission by the user device to be partially received during a scheduled reception window. The tuned transmission delay may allow the transmission by the user device to be fully received during the scheduled reception window.

Techniques for Location-Based Resource Scheduling

Figure 8:
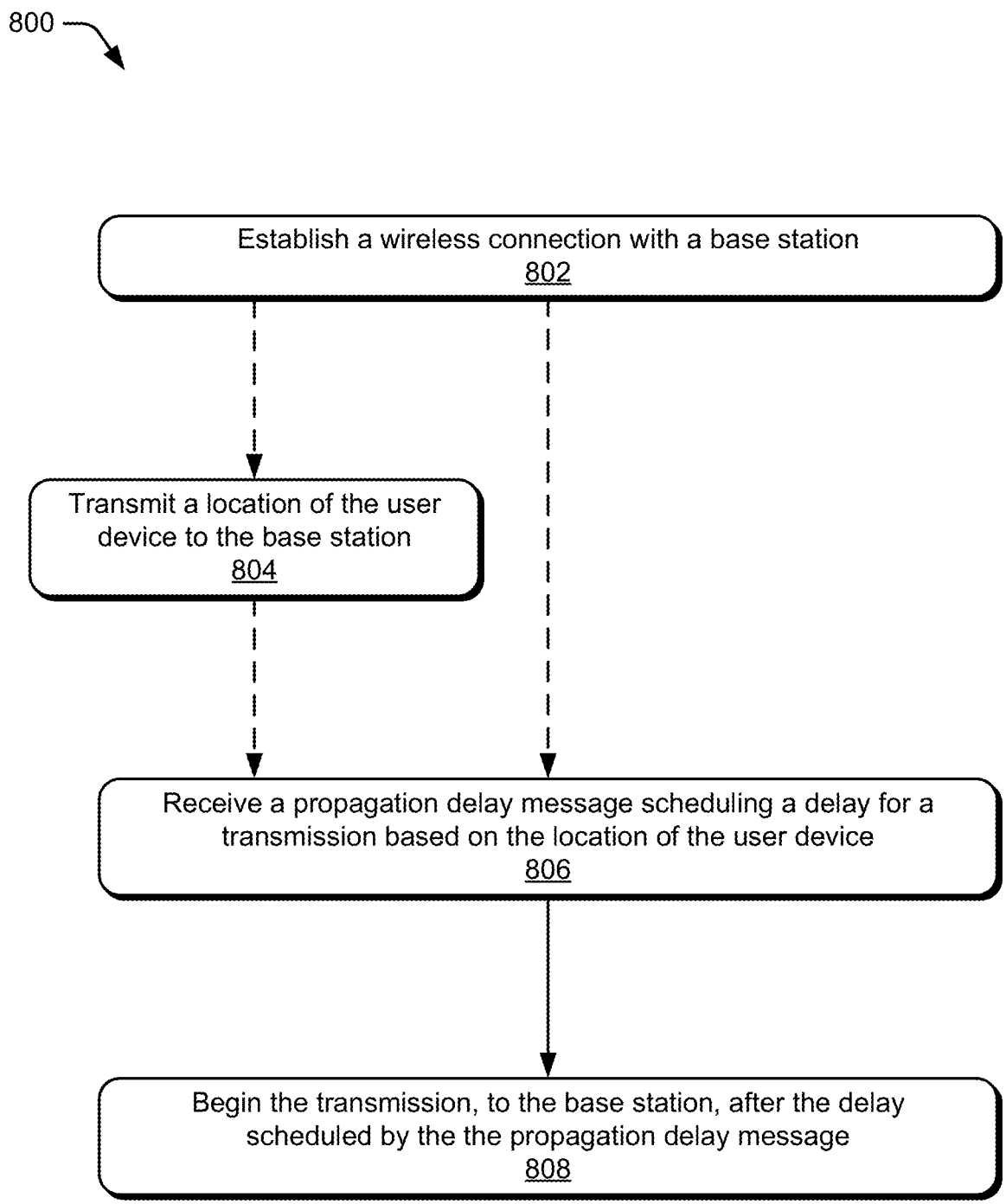
FIG. 8 illustrates an example method performed by the user device for location-based resource scheduling.
Figure 9:
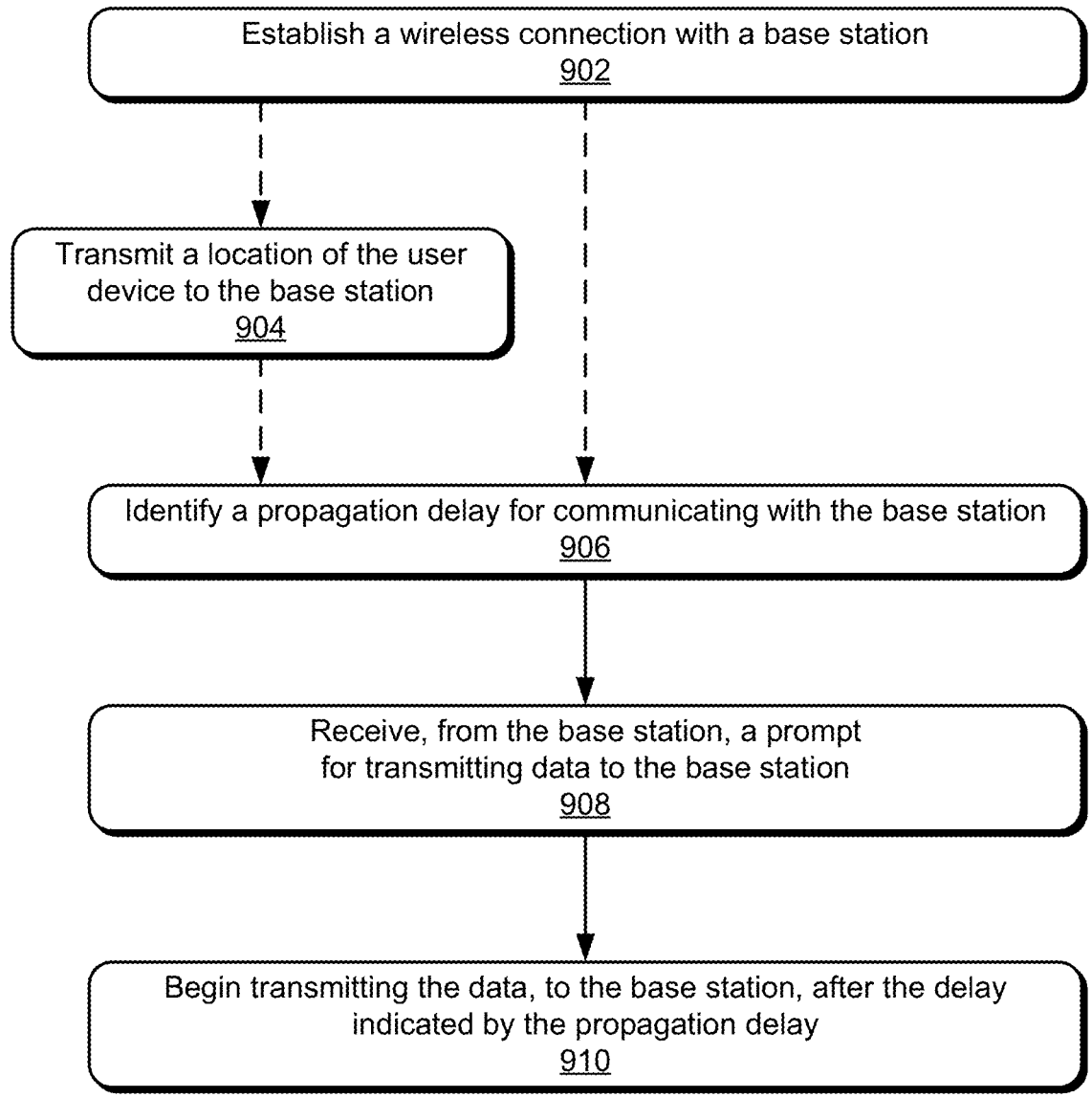
FIG. 9 illustrates another example method performed by the user device for location-based resource scheduling.
Figure 10:
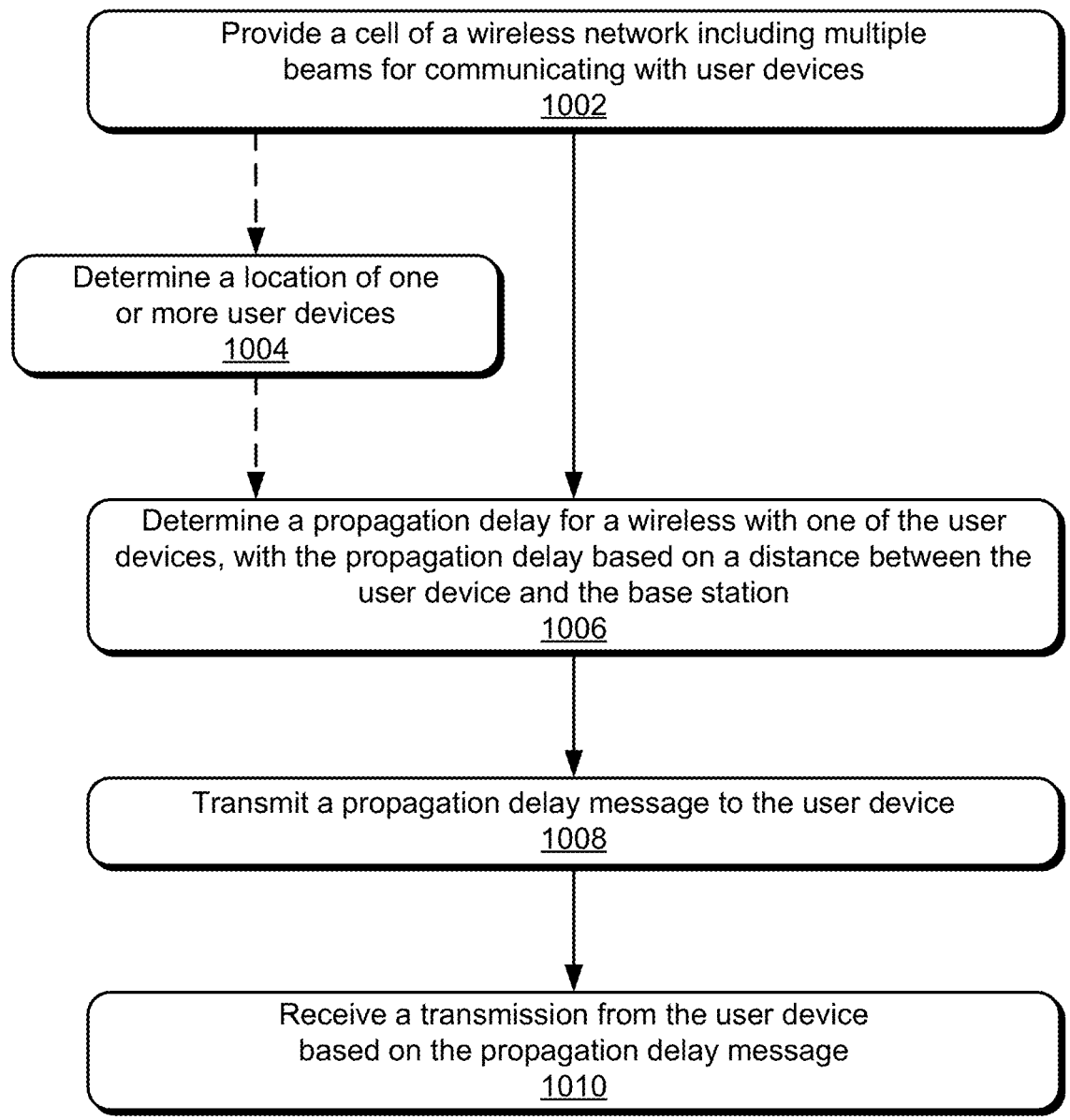
FIG. 10 illustrates another example method performed by the base station for location-based resource scheduling.

FIGS. 8-10 depict methods for implementing location-based resource scheduling. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference to FIGS. 1-7, reference to which is made for example only. The techniques are not limited to performance by one entity or multiple entities operating on one device, or those described in these figures.

FIG. 8 illustrates an example method 800 performed by a user device for location-based resource scheduling. The method 800 includes operations that may be performed by a communication scheduler, such as the communication scheduler 116, a location module, such as the location module 118, and a communication module, such as the communication module 120. In some aspects, operations of the method 800 may reduce or avoid lost communications or decrease an error rate for uplink transmissions.

At optional operation 802, the user device establishes a wireless connection with a base station. For example, the user device 102 establishes the wireless connection 106 with the base station 104. This may be performed via a transceiver of the user device 102 based on a protocol of a radio access technology associated with the wireless connection. For example, the user device 102 may request, via the PRACH 206, access to a wireless network provided by the base station 104. The base station 104 then transmits a communication schedule via the PDCCH 208.

At optional operation 804, the user device transmits a location of the user device to the base station. For example, the user device 102 transmits a location of the user device 102 to the base station 104 via the PRACH 206, the PUCCH 210, or the PUSCH 214.

At operation 806, the user device receives a propagation delay message that schedules a delay for a transmission of the user device. The delay is based on the location of the user device being outside of a standard distance from the base station. For example, the user device 102 receives the propagation delay message 304 from the base station 104 via one of a SIB or a MIB, which may be received over the PDCCH 208.

At operation 808, the user device begins transmitting, to the base station, the after the delay scheduled by the propagation delay message. For example, the user device 102 transmits the uplink transmission 530 after the delay 528 based on the propagation delay message 304.

FIG. 9 illustrates another example method 900 performed by a user device for location-based resource scheduling. The method 900 includes operations that may be performed by a communication scheduler, such as the communication scheduler 116, a location module, such as the location module 118, and a communication module, such as the communication module 120. The method 900 includes receiving a prompt for transmitting data and delaying a responsive transmission based on a propagation delay. In some aspects, operations of the method 900 may reduce or avoid lost communications or decrease an error rate for uplink transmissions.

At optional operation 902, the user device establishes a wireless connection with a base station. For example, the user device 102 establishes the wireless connection 106 with the base station 104. This may be performed via a transceiver of the user device 102 based on a protocol of a radio access technology associated with the wireless connection. For example, the user device 102 may request, via the PRACH 206, access to a wireless network provided by the base station 104. The base station 104 then transmits a communication schedule via the PDCCH 208.

At optional operation 904, the user device transmits a location of the user device to the base station. For example, the user device 102 transmits a location of the user device 102 to the base station 104 via the PRACH 206, the PUCCH 210, or the PUSCH 214.

At operation 906, the user device identifies a propagation delay for communicating with the base station over the wireless connection. The propagation delay identifies a delay for transmitting, relative to a standard timing for transmitting, based on the location of the user device. The delay may be based on the location of the user device being outside of a standard distance from the base station. For example, the user device 102 compares the location of the user device to a map index that indicates a propagation delay based on location. The propagation delay identifies the delay 528 relative to a standard timing for transmitting.

At operation 908, the user device receives, from the base station, a prompt for transmitting data to the base station. For example, the user device receives, from the base station 104, the transmission 306 with instructions for transmitting the responsive transmission 308. The prompt may include an uplink grant that is transmitted over the PDCCH 208.

At operation 910, the user device begins transmitting the data, to the base station, after the delay indicated by the propagation delay. For example, the user device 102 transmits the responsive transmission 308 as the uplink transmission 530 after the delay 528.

FIG. 10 illustrates an example method 1000 performed by a base station for location-based resource scheduling. The method 1000 includes operations that may be performed by a resource manager, such as the resource manager 126, a propagation delay manager, such as the propagation delay manager 128, and a communication module, such as the communication module 130. In some aspects, operations of the method 1000 may reduce or avoid lost communications or decrease an error rate for uplink transmissions.

At operation 1002, the base station provides a cell of a wireless network. The base station is configured for beamformed communication with multiple user devices, for example, by the base station segmenting the cell into multiple beams. For example, the base station 104 provides a cell of a wireless network over the beams 604, 608, and 612 over which the base station 104 communicates with the user devices 602, 606, and 610.

At optional operation 1004, the base station determines a location of one or more user devices. For example, the base station 104 receives location data 302 for one or more of the user devices 602, 606, or 610.

At operation 1006, the base station determines a propagation delay for a wireless connection, over a beam of the multiple beams, with one of the user devices. The propagation delay is based on a distance, along a path of the beam, between the user device and the base station. For example, the base station 104 determines a propagation delay for communicating with one or more of the user devices 606 based on a distance, along a path of the beam 608, between the user devices 606 and the base station 104.

At operation 1008, the base station transmits a propagation delay message to the user device. In some aspects, the base station transmits the propagation delay message to the user device over a first beam of multiple beams provided by the base station. The propagation delay message indicates a transmission delay for a transmission for the user device. The transmission delay is based on the propagation delay. For example, the base station 104 transmits the propagation delay message 304, via a SIB or a MIB, to one of the user devices 606. The propagation delay message 304 indicates the delay 528 that is based on the propagation delay 516.

At operation 1010, the base station receives the transmission from the user device based on the propagation delay message. For example, the base station 104 receives the uplink transmission 530 during the communication resource 524 based on the propagation delay message 304, which provided an instruction for a delay, such as the delay 528.

Although techniques using, and apparatuses for implementing, location-based resource scheduling have been described in language specific to features and/or methods, it is to be understood that the subject of the appended claims is not necessarily limited to the specific features or methods described. Rather, the specific features and methods are disclosed as example ways in which location-based resource scheduling can be implemented.

In the following several examples are described.

Example 1

A method performed by a user device for location-based resource scheduling, the method comprising:
 establishing a wireless connection with a base station, the base station providing a cell of a wireless network, the cell including multiple beams for communicating with multiple user devices;
 receiving, from the base station over a first beam of the multiple beams, a propagation delay message;
 based on the propagation delay message, scheduling a delay for a transmission of data by the user device over the first beam,
  the delay based on a location of the user device being outside of a standard distance from the base station along a path of the first beam; and
 beginning the transmission of data over the first beam, to the base station, after the delay such that the base station is projected to receive the data during the delayed reception window including one or more communication resources, the delayed reception window beginning at least one communication resource after a standard reception window begins.

Example 2

The method as recited in example 1, further comprising, before receiving the propagation delay message, transmitting the location of the user device to the base station.

Example 3

The method as recited in example 1 or 2, wherein scheduling the delay comprises:
 scheduling a first delay for the transmission of data by the user device over a first channel of the wireless connection; and
 scheduling a second delay for a second transmission of data by the user device over a second channel of the wireless connection.

Example 4

The method as recited in at least one of the preceding examples, wherein the scheduled delay spans a duration of time that is less than a duration of an entire communication resource of the one or more communication resources.

Example 5

The method as recited in at least one of the preceding examples, further comprising, receiving the propagation delay message over a physical downlink control channel (PDCCH).

Example 6

The method as recited in at least one of the preceding examples, further comprising, receiving the propagation delay message within at least one of a master information block (MIB) or a system information block (SIB).

Example 7

The method as recited in at least one of the preceding examples, wherein the propagation delay message identifies a propagation delay of a second beam of the multiple beams over which communication with the base station is available to the user device.

Example 8

The method as recited in example 7, further comprising: requesting communication with the base station over the second beam.

Example 9

The method as recited in at least one of the examples, further comprising:
 requesting communication with the base station over a second beam of the multiple beams.

Example 10

The method as recited in at least one of the preceding examples, wherein the propagation delay accounts for the path of the first beam having an indirect path that reflects off one or more objects between the base station and the user device.

Example 11

The method as recited in at least one of the examples, wherein beginning the transmission of data over the first beam comprises:
  transmitting a first data stream over a first spatial layer; and
  transmitting a second data steam over a second spatial layer.

Example 12

The method as recited in at least one of the preceding examples, further comprising:
  identifying a propagation delay for communicating with the base station over the wireless connection,
  the propagation delay indicating a delay for transmitting data over a beam of the multiple beams, relative to a standard timing for transmitting, based on a location of the user device; and
  receiving, from the base station, a prompt for transmitting data to the base station.

Example 13

The method as recited in example 12, wherein identifying the propagation delay includes at least one of:
  identifying a transmission distance from the location of the user device to the base station along a path of the beam; or
  comparing the location of the user device with a map index.

Example 14

The method as recited in at least one of the preceding examples, further comprising:
  identifying the location of the user device using a global navigation satellite system receiver.

Example 15

The method as recited in at least one of examples 12 to 14, wherein the prompt for transmitting data is part of an uplink grant.

Example 16

The method as recited in at least one of the preceding examples, further comprising:
  receiving, from the base station, a message identifying a second beam of the multiple beams over which communication with the base station is available to the user device; and
  requesting, from the base station, communication with the base station over the second beam.

Example 17

A user device comprising:
a processor;
a hardware-based transceiver; and
a computer-readable storage medium having stored thereon instructions that, responsive to execution by the processor, cause the processor to execute the method of any of the preceding examples.

Example 18

A method performed by a base station for location-based resource scheduling, the method comprising:
  providing a cell of a wireless network, the cell including multiple beams for communicating with user devices;
  determining a first propagation delay for a wireless connection, over a first beam of the multiple beams and with a first user device of the user devices, the first propagation delay based on a distance, along a path of the first beam, between the first user device and the base station;
  transmitting a first propagation delay message to the first user device over the first beam, the first propagation delay message indicating a transmission delay, based on the first propagation delay, for a transmission of data over the first beam by the first user device, the transmission delay calculated such that the base station is projected to receive the data transmitted by the first user device during a delayed reception window including one or more communication resources, the delayed reception window beginning at least one communication resource after a standard reception window begins; and
  receiving, during the delayed reception window, the transmission of data from the first user device based on the first propagation delay message.

Example 19

The method as recited in example 18, further comprising:
  scheduling one or more resources of the wireless connection for receiving the transmission, the one or more resources scheduled based on the first propagation delay.

Example 20

The method as recited in examples 18 or 19, further comprising:
  determining a second propagation delay for a second wireless connection, over a second beam, with a second user device of the user devices; and
  transmitting a second propagation delay message indicating a second transmission delay to the second user device over the second beam,
  the second propagation delay based on a second distance, between the second user device and the base station, along a path of the second beam.

Example 21

The method as recited in at least one of the examples 18 to 20, further comprising:
  determining a second propagation delay for a second wireless connection, over the first beam, with a second user device of the user devices; and
  transmitting a second propagation delay message indicating a second transmission delay to the second user device over the first beam, the second propagation delay based on a second distance, between the second user device and the base station, along the path of the first beam.

Example 22

The method as recited in at least one of the examples 18 to 21, further comprising:
transmitting the first propagation delay message over a second beam of the multiple beams to a second user device of the user devices.

Example 23

The method as recited in at least one of the examples 18 to 22, further comprising:
transmitting a second propagation delay message to the first user device,
the second propagation delay message indicating a second propagation delay over a second beam of the multiple beams, and
the second beam is available to the first user device to communicate over the wireless connection.

Example 24

The method recited in at least one of the examples 18 to 23, further comprising:
determining a second propagation delay for the wireless connection, over a second beam of the multiple beams and with the first user device of the user devices, the second propagation delay based on a distance, along a path of the second beam, between the first user device and the base station; and
transmitting a second propagation delay message identifying the second propagation delay to the first user device.

Example 25

The method recited in example 24, further comprising:
receiving, from the base station, a request for transfer of communication from the first beam to the second beam; and
transferring communication with the first user device from the first beam to the second beam.

Example 26

The method recited in at least one of the examples 18 to 25, wherein receiving, during the delayed reception window, the transmission of data from the first user device based on the first propagation delay message further comprises:
receiving a first data stream over a first spatial layer; and
receiving a second data steam over a second spatial layer.

Example 27

A user device comprising:
a processor;
a hardware-based transceiver; and
a computer-readable storage medium having stored thereon instructions that, responsive to execution by the processor, cause the processor to execute the method of any of examples 18 to 26.

Example 28

A user device comprising:
a processor;
a hardware-based transceiver; and
a computer-readable storage medium having stored thereon instructions that, responsive to execution by the processor, cause the processor to perform operations comprising:
establishing, via the hardware-based transceiver, a wireless connection with a base station of a wireless network, the base station providing a cell of the wireless network, the cell including multiple beams for communicating with multiple user devices;
identifying a propagation delay for communicating with the base station over the wireless connection,
the propagation delay indicating a delay for transmitting data over a beam of the multiple beams, relative to a standard timing for transmitting, based on a location of the user device;
receiving, from the base station via the hardware-based transceiver, a prompt for transmitting data to the base station; and
begin transmitting the data over the beam, to the base station via the hardware-based transceiver, after the delay indicated by the propagation delay, the propagation delay configured to cause the base station to receive the data during a delayed reception window including one or more communication resources, the delayed reception window beginning at least one communication resource after a standard reception window begins.

Example 29

The user device as recited in example 28, wherein identifying the propagation delay includes identifying a transmission distance from the location of the user device to the base station along a path of the beam.

Example 30

The user device as recited in example 28 or 29, wherein identifying the propagation delay further includes comparing the location of the user device with a map index.

Example 31

The user device as recited in at least one of the examples 28 to 30, wherein the user device identifies the location of the user device using a global navigation satellite system receiver.

Example 32

The user device as recited in at least one of the examples 28 to 31, wherein the prompt for transmitting data is part of an uplink grant.

Example 33

The user device as recited in at least one of the examples 28 to 32, wherein the delay for transmitting data spans a duration of time that is less than a duration of an entire communication resource of the one or more communication resources.

Example 34

The user device as recited in at least one of the examples 28 to 33, wherein the operations further comprise:

receiving, from the base station via the hardware-based transceiver, a message identifying a second beam of the multiple beams over which communication with the base station is available to the user device.

Example 35

The user device as recited in example 34, wherein the operations further comprise:
requesting, from the base station via the hardware-based transceiver, communication with the base station over the second beam.

Example 36

The user device as recited in at least one of the examples 28 to 35, wherein the operations further comprise:
requesting, from the base station via the hardware-based transceiver, communication with the base station over a second beam.

Example 37

The user device as recited in at least one of the examples 28 to 36, wherein the propagation delay accounts for the path of the beam having an indirect path that reflects off one or more objects between the base station and the user device.

Example 38

The user device as recited in at least one of the examples 28 to 37, wherein beginning the transmission of data over the beam further comprises:
transmitting a first data stream over a first spatial layer; and
transmitting a second data steam over a second spatial layer.

Example 39

A base station comprising:
a processor;
one or more hardware-based transceivers; and
a computer-readable storage medium having stored thereon instructions that, responsive to execution by the processor, cause the processor to perform operations comprising:
provide, via the one or more hardware-based transceivers, a cell of a wireless network, the cell including multiple beams for communicating with user devices;
determine a first propagation delay for a wireless connection, over a first beam of the multiple beams and with a first user device of the user devices, the first propagation delay based on a distance, along a path of the first beam, between the first user device and the base station;
transmit, via the one or more hardware-based transceivers, a first propagation delay message to the first user device over the first beam, the first propagation delay message indicating a transmission delay, based on the first propagation delay, for a transmission of data over the first beam by the first user device, the transmission delay calculated such that the base station is projected to receive the data transmitted by the first user device during a delayed reception window including one or more communication resources, the delayed reception window beginning at least one communication resource after a standard reception window begins; and
receive, via the one or more hardware-based transceivers and during the delayed reception window, the transmission of data from the first user device based on the first propagation delay message.

Example 40

The base station as recited in example 39, wherein the operations further comprise scheduling one or more resources of the wireless connection for receiving the transmission, the one or more resources scheduled based on the first propagation delay.

Example 41

The base station as recited in example 39 or 40, wherein:
the operations further comprise:
determining a second propagation delay for a second wireless connection, over a second beam, with a second user device of the user devices;
transmitting, via the one or more hardware-based transceivers, a second propagation delay message indicating a second transmission delay to the second user device over the second beam; and
the second propagation delay is based on a second distance, between the second user device and the base station, along a path of the second beam.

Example 42

The base station as recited in example 41, wherein the second propagation delay has a duration that is different than a duration of the first propagation delay.

Example 43

The base station as recited in example 42, wherein:
the operations further comprise:
determining a second propagation delay for a second wireless connection, over the first beam, with a second user device of the user devices; and
transmitting, via the one or more hardware-based transceivers, a second propagation delay message indicating the second transmission delay to the second user device over the first beam,
the second propagation delay based on a second distance, between the second user device and the base station, along the path of the first beam.

Example 44

The base station as recited in example 43, wherein the second propagation delay has a duration that is different than a duration of the first propagation delay.

Example 45

The base station as recited in at least one of the examples 39 to 44, wherein the operations further comprise transmitting, via the one or more hardware-based transceivers, the first propagation delay message over a second beam of the multiple beams to a second user device of the user devices.

Example 46

The base station as recited in example 45, wherein the base station transmits the first propagation delay message over the second beam to the second user device of the user devices based on a location of the second user device being near a location of the first user device.

Example 47

The base station as recited in example 45,
wherein the base station transmits the first propagation delay message over the first beam to the second user device based on the first user device and the second user device communicating with the base station via a same beam as the first user device communicates with the base station.

Example 48

The base station as recited in at least one of the examples 39 to 47,
wherein the operations further comprise:
transmitting, via the one or more hardware-based transceivers, a second propagation delay message to the first user device;
the second propagation delay message indicates a second propagation delay over a second beam of the multiple beams; and
the second beam is available to the first user device to communicate over the wireless connection.

Example 49

The base station recited in at least one of the examples 39 to 48, wherein the operations further comprise:
determining a second propagation delay for the wireless connection, over a second beam of the multiple beams and with the first user device of the user devices, the second propagation delay based on a distance, along a path of the second beam, between the first user device and the base station.

Example 50

The base station recited in example 49, wherein the operations further comprise:
transmitting, via the one or more hardware-based transceivers, a second propagation delay message identifying the second propagation delay to the first user device.

Example 51

The base station recited in example 50, wherein the operations further comprise:
receiving, from the base station via the one or more hardware-based transceivers, a request for transfer of communication from the first beam to the second beam.

Example 52

The base station recited in example 51, wherein the operations further comprise:
transferring communication with the first user device from the first beam to the second beam.

Example 53

The base station recited in at least one of the examples 39 to 52,
wherein the operation of receiving, via the one or more hardware-based transceivers and during the delayed reception window, the transmission of data from the first user device based on the first propagation delay message further comprises:
receiving a first data stream over a first spatial layer; and
receiving a second data steam over a second spatial layer.

Example 54

The method recited in at least one of the examples 18 to 20, further comprising determining a second propagation delay for a second wireless connection, over a second beam of the multiple beams and with a second user device of a second group of user devices, the second propagation delay based on a second distance, between the second user device and the base station, along a path of the second beam; calculating a second transmission delay, based on the second propagation delay, for a transmission of data over the second beam by the second user device, the second transmission delay calculated such that the base station is projected to receive the data transmitted by the second user device during a second delayed reception window beginning at least one communication resource after a second reception window begins, the second transmission delay spanning a duration of time that is less than the duration of an entire communication resource; and transmitting a second propagation delay message indicating the second transmission delay to at least one user device of the second group of user devices over the second beam.

Example 55

The method as recited in at least one of the examples 18 to 22, further comprising transmitting a second propagation delay message to the first user device, the second propagation delay message indicating a second propagation delay over a second beam of the multiple beams, and the second beam is available to the first user device to communicate over the wireless connection.

Example 56

The method recited in at least one of the examples 18 to 23, further comprising: determining a second propagation delay for the wireless connection, over a second beam of the multiple beams and with the first user device of the first group of user devices, the second propagation delay based on a distance, along a path of the second beam, between the first user device and the base station; and transmitting a second propagation delay message identifying the second propagation delay to the first user device.

Example 57

The method recited in example 24, further comprising: receiving, from the first user device, a request for transfer of communication from the first beam to the second beam; and transferring communication with the first user device from the first beam to the second beam.

The invention claimed is:
1. A method performed by a user device for location-based resource scheduling, the method comprising:

establishing a wireless connection with a base station, the base station providing a cell of a wireless network, the cell including multiple beams for communicating with multiple user devices;

receiving, from the base station over a first beam of the multiple beams, a propagation delay message indicating a transmission delay for a transmission by the user device over the wireless connection;

scheduling, utilising the transmission delay, a delay for a transmission of data by the user device, the scheduled delay spanning a duration of time that is less than a duration of a resource block of one or more communication resources available for communication between the user device and the base station over the wireless connection; and beginning a transmission of data over the first beam, to the base station, after the scheduled delay.

2. The method as recited in claim 1, further comprising:
before receiving the propagation delay message, identifying a location of the user device; and
transmitting the location of the user device to the base station.

3. The method as recited in claim 2, wherein identifying the location of the user device comprises:
receiving global navigation satellite system location data for the user device.

4. The method as recited in claim 1, wherein scheduling the scheduled delay further comprises:
scheduling a first delay for the transmission of data by the user device over a first channel of the wireless connection; and
scheduling a second delay for a second transmission of data by the user device over a second channel of the wireless connection.

5. The method as recited in claim 1, further comprising at least one of:
receiving the propagation delay message over a physical downlink control channel (PDCCH);
receiving the propagation delay message within a master information block (MIB); or
receiving the propagation delay message within a system information block (SIB).

6. The method as recited in claim 1, wherein beginning the transmission of data over the first beam comprises:
transmitting a first data stream over a first spatial layer; and
transmitting a second data steam over a second spatial layer.

7. The method as recited in claim 6, further comprising:
receiving, from the base station, a prompt for the user device to begin the transmission of data over the first beam, the prompt for transmitting data is part of an uplink grant.

8. The method as recited in claim 1, further comprising:
before beginning the transmission of data over the first beam, receiving, from the base station, a prompt for transmitting data to the base station; and
responsive to the prompt, beginning the transmission of data over a first frame after the scheduled delay.

9. The method as recited in claim 1, further comprising:
receiving, in the propagation delay message, an identification of a second beam of the multiple beams over which communication with the base station is available to the user device; and
requesting, from the base station, communication with the base station over the second beam.

10. A method performed by a base station for location-based resource scheduling, the method comprising:
providing a cell of a wireless network, the cell including multiple beams for communicating with user devices;
determining a first propagation delay for a wireless connection, over a first beam of the multiple beams and with a first user device of a first group of the user devices, the first propagation delay based on a distance, along a path of the first beam, between the first user device and the base station;
calculating a first transmission delay, based on the first propagation delay, for a transmission of data over the first beam by the first user device, the first transmission delay calculated such that the base station is projected to receive the data transmitted by the first user device during a first delayed reception window beginning at least one resource block after a first reception window begins, the first transmission delay spanning a duration of time that is less than a duration of a resource block;
transmitting a first propagation delay message to at least one user device of the first group of user devices over the first beam, the first propagation delay message indicating the first transmission delay; and
receiving, during the first delayed reception window, the transmission of data from the at least one user device of the first group of user devices.

11. The method as recited in claim 10, further comprising:
scheduling one or more resources of the wireless connection for receiving the transmission, the one or more resources scheduled based on the first propagation delay.

12. The method as recited in claim 10, further comprising:
determining a second propagation delay for a second wireless connection, over the first beam and with a second user device of the first group of user devices, the second propagation delay based on a second distance, between the second user device and the base station, along a path of the first beam;
calculating a second transmission delay, based on the second propagation delay, for a transmission of data over the first beam by the second user device, the second transmission delay calculated such that the base station is projected to receive the data transmitted by the second user device during a second delayed reception window beginning at least one resource block after a second reception window begins, the second transmission delay spanning a duration of time that is less than the duration of a resource block; and
transmitting a second propagation delay message indicating the second transmission delay to the second user device over the first beam.

13. The method as recited in claim 10, further comprising:
transmitting the first propagation delay message over a second beam of the multiple beams to a second user device of a second group of user devices.

14. The method recited in claim 10, wherein receiving, during the first delayed reception window, the transmission of data from the first user device based on the first propagation delay message further comprises:
receiving a first data stream over a first spatial layer; and
receiving a second data steam over a second spatial layer.

15. The method as recited in claim 10, wherein transmitting the first propagation delay message to at least one user device of the first group of user devices over the first beam comprises:
transmitting the first propagation delay message to a second user device of the first group of user devices based on a location of the second user device being near a location of the first user device.

16. The method as recited in claim 15, further comprising: receiving, during the first delayed reception window, the transmission of data from the second user device.

17. A method performed by a user device for location-based resource scheduling, the method comprising:
    establishing a wireless connection with a base station, the base station providing a cell of a wireless network, the cell including multiple beams for communicating with multiple user devices;
    determining a propagation delay for communicating with the base station over the wireless connection;
    determining a transmission delay accommodating the propagation delay for transmitting data over a beam of the multiple beams, the transmission delay relative to a timing for transmitting;
    scheduling, utilizing the transmission delay, a delay for a transmission of data over a beam of the multiple beams to the base station, the scheduled delay spanning a duration of time that is less than a duration of a resource block; and
    beginning the transmission of data over the beam, to the base station, after the scheduled delay.

18. The method as recited in claim 17, further comprising:
    identifying a location of the user device, and
    wherein determining the propagation delay for communicating with the base station over the wireless connection comprises at least one of:
        identifying a transmission distance from a location of the user device to the base station along a path of the beam; or
        comparing the location of the user device with a map index.

19. The method as recited in claim 18, wherein identifying the location of the user device comprises:
    receiving global navigation satellite system location data.

20. The method as recited in claim 18, further comprising:
    before beginning the transmission of data over the beam, receiving, from the base station, a prompt for transmitting data to the base station; and
    responsive to the prompt, beginning the transmission of data over a first frame after the scheduled delay.

* * * * *

UNITED STATES PATENT AND TRADEMARK OFFICE
CERTIFICATE OF CORRECTION

PATENT NO. : 11,382,056 B2
APPLICATION NO. : 17/040794
DATED : July 5, 2022
INVENTOR(S) : Jibing Wang and Erik Richard Stauffer It is certified that error appears in the above-identified patent and that said Letters Patent is hereby corrected as shown below:

In the Claims

Column 25, Line 7, Claim 1, after "a" before "delay" delete "transmission"

Column 25, Lines 8-9, Claim 1, after "connection" before "the" delete "scheduling, utilising" enter --utilizing--

Column 25, Line 9, Claim 1, after "delay," before "a" enter --scheduling--

Column 25, Line 28, Claim 4, after "the" before "delay" delete "scheduled"

Signed and Sealed this
Thirtieth Day of August, 2022

Katherine Kelly Vidal
*Director of the United States Patent and Trademark Office*